United States Patent
Kuramoto et al.

(10) Patent No.: US 11,085,392 B2
(45) Date of Patent: Aug. 10, 2021

(54) INTAKE AIR AMOUNT MEASURING DEVICE AND METHOD

(71) Applicants: TOYOTA JIDOSHA KABUSHIKI KAISHA, Toyota (JP); DENSO CORPORATION, Kariya (JP)

(72) Inventors: Hisato Kuramoto, Anjo (JP); Noboru Kitahara, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/758,703

(22) PCT Filed: Nov. 20, 2018

(86) PCT No.: PCT/JP2018/042799
§ 371 (c)(1),
(2) Date: Apr. 23, 2020

(87) PCT Pub. No.: WO2019/107217
PCT Pub. Date: Jun. 6, 2019

(65) Prior Publication Data
US 2020/0340416 A1    Oct. 29, 2020

(30) Foreign Application Priority Data
Nov. 28, 2017 (JP) .............................. JP2017-228087

(51) Int. Cl.
*F02D 41/18* (2006.01)
*G01F 1/68* (2006.01)
*G01F 5/00* (2006.01)

(52) U.S. Cl.
CPC ............. *F02D 41/187* (2013.01); *G01F 1/68* (2013.01); *G01F 5/00* (2013.01)

(58) Field of Classification Search
CPC .......... F02D 41/18; F02D 41/187; G01F 1/68; G01F 1/72; G01F 5/00
See application file for complete search history.

(56) References Cited

U.S. PATENT DOCUMENTS 4,420,972 A * 12/1983 Kuroiwa ................... G01F 1/68
                                                    73/114.32
4,907,557 A *  3/1990 Ishii ....................... F02D 41/187
                                                    123/488

(Continued)

FOREIGN PATENT DOCUMENTS

CN        103154676 A     6/2013
JP       2000-320391 A   11/2000

(Continued)

OTHER PUBLICATIONS

International Search Report and Written Opinion dated Apr. 11, 2019 in PCT/JP2018/042799 filed on Nov. 20, 2018, 10 pages.

*Primary Examiner* — Francis C Gray
(74) *Attorney, Agent, or Firm* — Oblon, McClelland, Maier & Neustadt, L.L.P.

(57) ABSTRACT

An intake air amount measuring device includes a by-pass-type air flowmeter and a processor that calculates an intake air amount of an engine based on the measurement result of the air flowmeter. When calculating the intake air amount, the processor performs lag or lead compensation for a response delay of a change in an intake flow rate in the bypass passage in relation to a change in an intake flow rate in the main passage based on loss coefficients of the main passage and the bypass passage. The processor causes values of the loss coefficients of the main passage and the bypass passage, which are used in the compensation, to be different between a forward flow state, in which the intake air flows through the main passage in a forward direction, and a (Continued)

backflow state, in which the intake air flows through the main passage in a reverse direction.

4 Claims, 4 Drawing Sheets

(56) References Cited

U.S. PATENT DOCUMENTS

| | | | | |
|---|---|---|---|---|
| 4,991,547 | A * | 2/1991 | Davis | F02M 26/36 |
| | | | | 123/184.54 |
| 5,942,683 | A * | 8/1999 | Aoi | G01F 1/692 |
| | | | | 73/202.5 |
| 2003/0230287 | A1* | 12/2003 | Ozeki | G01M 3/025 |
| | | | | 123/479 |
| 2006/0016254 | A1 | 1/2006 | Okuda et al. | |
| 2013/0167626 | A1 | 7/2013 | Aoyagi | |
| 2018/0017422 | A1* | 1/2018 | Tashiro | G01F 1/699 |

FOREIGN PATENT DOCUMENTS

| | | |
|---|---|---|
| JP | 2002-295292 A | 10/2002 |
| JP | 2004-020454 A | 1/2004 |
| JP | 2004-239103 A | 8/2004 |
| JP | 2006-2581 A | 1/2006 |
| JP | 2008-2833 A | 1/2008 |

* cited by examiner

[Fig. 1]
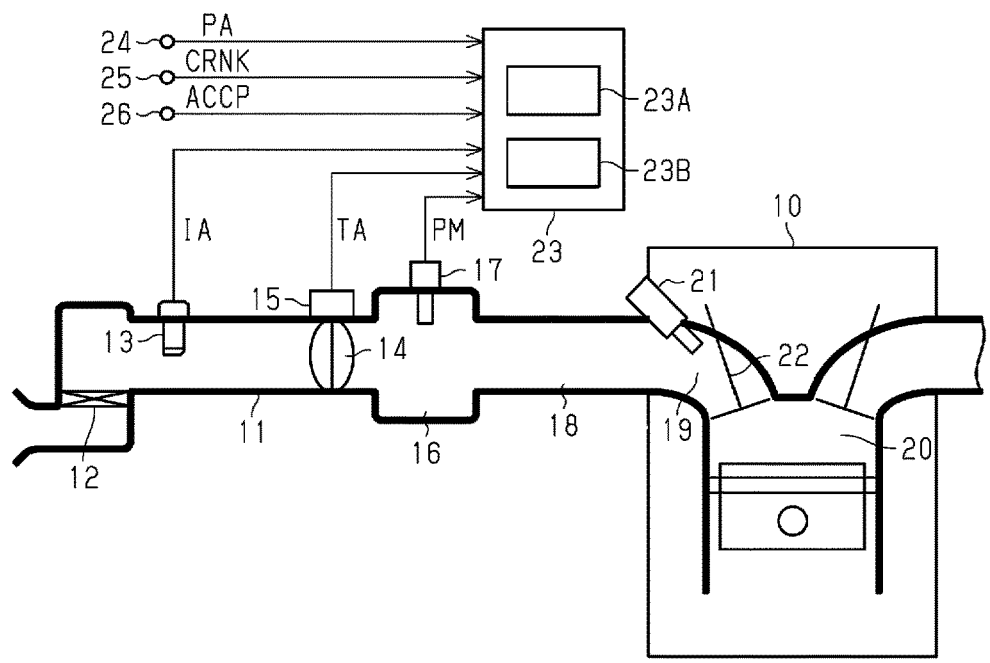
[Fig. 2]
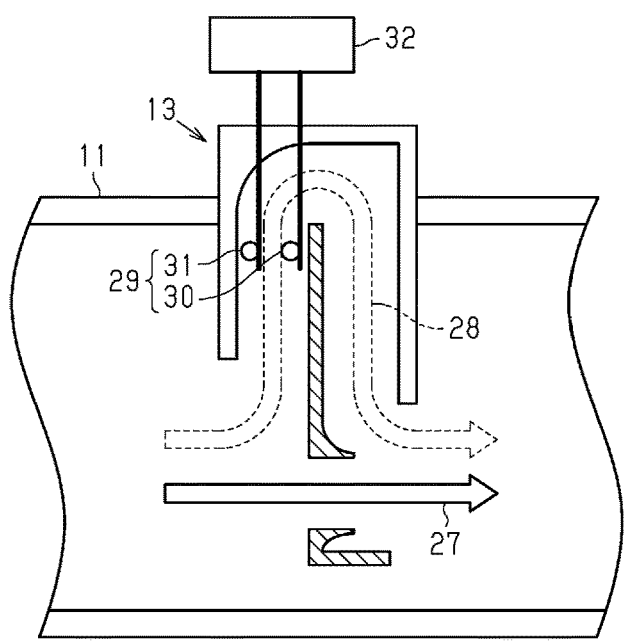

[Fig. 3]
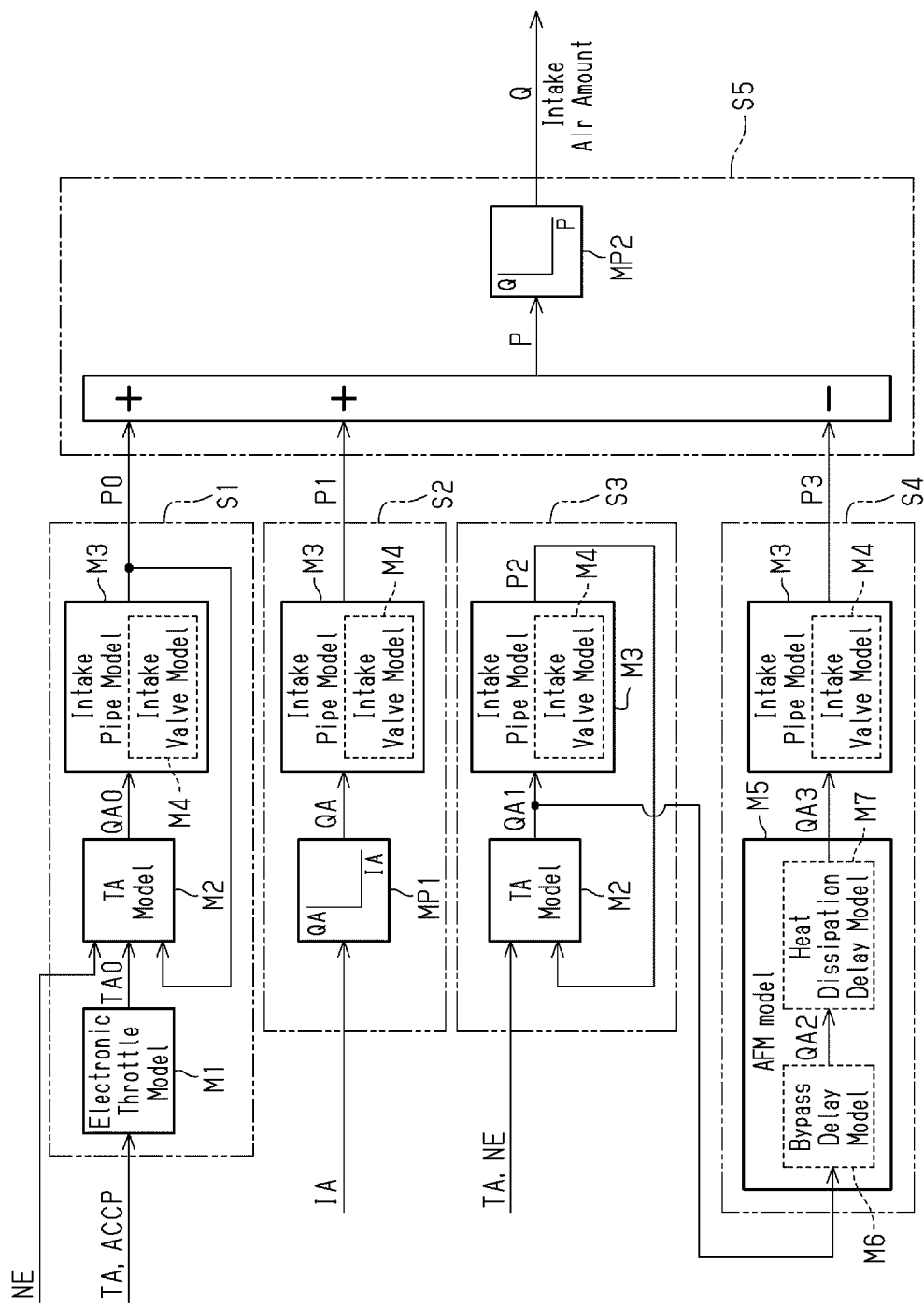

[Fig. 4]
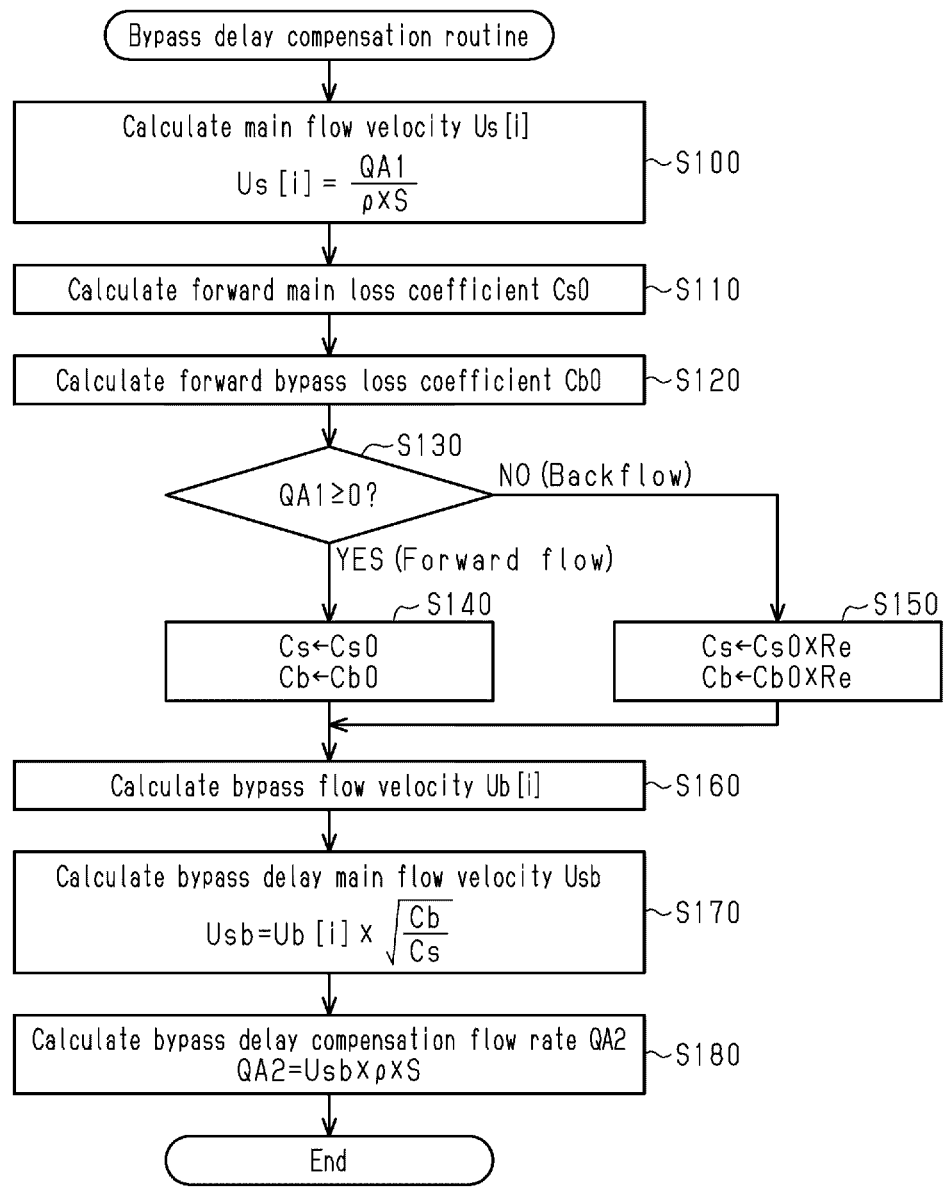

[Fig. 5]
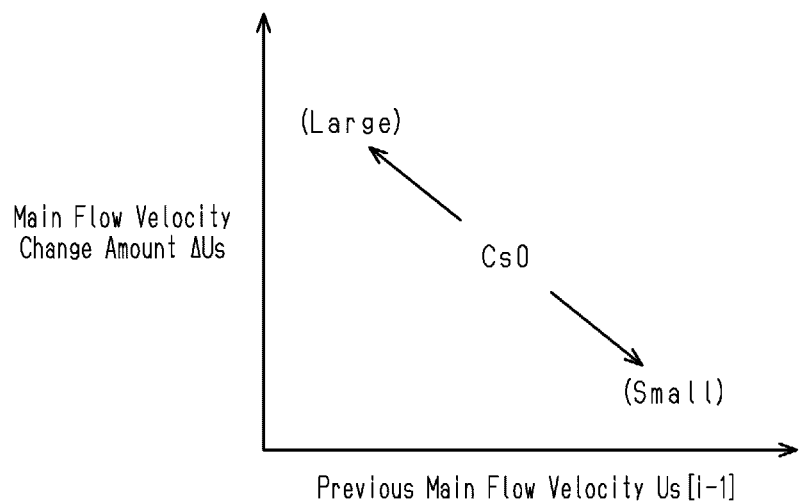
[Fig. 6]
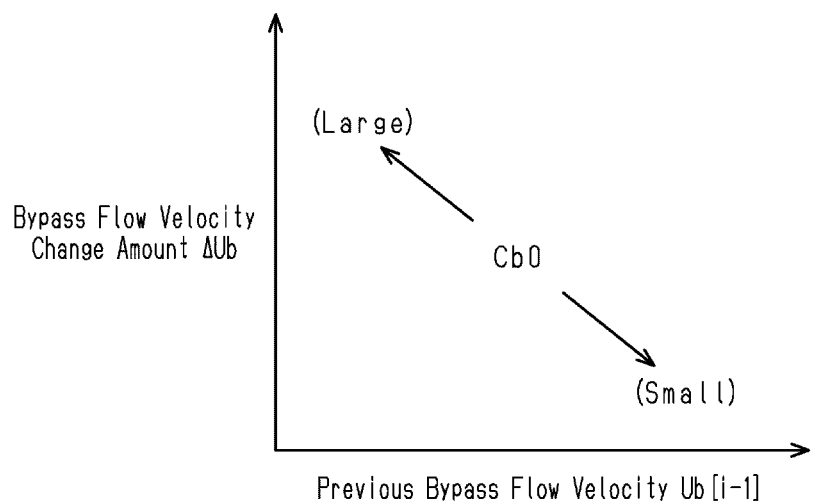

INTAKE AIR AMOUNT MEASURING DEVICE AND METHOD

TECHNICAL FIELD

The present disclosure relates to an intake air amount measuring device and method that measure the amount of intake air of an engine with a bypass-type air flowmeter.

CROSS REFERENCE TO RELATED APPLICATION

This application claims priority from Japanese Patent Application No. 2017-228087, filed on Nov. 28, 2017, the disclosure of which is incorporated herein by reference in its entirety.

BACKGROUND ART

An engine mounted on a vehicle, for example, includes an intake air amount measuring device. The measuring device may include a bypass-type air flowmeter, which separates the intake air flowing through the intake passage into a main passage and a bypass passage and outputs a measurement result of the intake flow rate in the bypass passage. The measuring device measures the amount of intake air of the engine by calculating the intake air amount based on the measurement result of the intake flow rate in the bypass passage (the bypass flow rate), which is output by the air flowmeter. When the intake flow rate in the main passage (the main flow rate) changes, the bypass flow rate changes after a delay. The duration of this response delay (bypass delay) between a change in the main flow rate and a change in the bypass flow rate can be determined from the loss coefficients of the main and bypass passages. When calculating the intake air amount, the intake air amount measuring device of Patent Document 1 compensates for the bypass delay based on the loss coefficients of the main and bypass passages so as to synchronize the flow rate values.

CITATION LIST

Patent Literature

PTL 1: Japanese Laid-Open Patent Publication No. 2006-2581

SUMMARY OF INVENTION

Technical Problem

In an air flowmeter, there may be temporary backflow of intake air due to factors such as pulsation of the intake air flowing through the intake passage. However, the conventional intake air amount measuring device compensates for the bypass delay without considering such backflow of intake air in the air flowmeter. This lowers the accuracy in measuring the intake air amount when there is backflow.

It is an objective of the present disclosure to provide an intake air amount measuring device and method that accurately measure the intake air amount even when backflow of intake air occurs in the air flowmeter.

Solution to Problem

In order to meet the objective, the intake air amount measuring device comprises a bypass-type air flowmeter, which is configured to separate intake air flowing through the intake passage into a main passage and a bypass passage and output a measurement result of the intake flow rate in the bypass passage, and a processor configured to calculate the intake air amount of the engine based on the measurement result of the air flowmeter. In the air flowmeter, when the intake flow rate in the main passage (the main flow rate) changes, the intake flow rate in the bypass passage (the bypass flow rate) changes after a delay. The measurement result of the bypass flow rate that is output by the air flowmeter includes this response delay (bypass delay) between a change in the main flow rate and a change in the bypass flow rate. To calculate the intake air amount, the measurement result of the air flowmeter, which includes the bypass delay, may be subjected to lag or lead compensation for the bypass delay so as to synchronize the flow rates.

The duration of the bypass delay may be calculated based on the loss coefficient of the main passage and the loss coefficient of the bypass passage. The processor of the intake air amount measuring device is configured to perform lag or lead compensation when calculating the intake air amount. The lag or lead compensation is performed to compensate for a response delay of a change in the intake flow rate in the bypass passage in relation to a change in the intake flow rate in the main passage based on the loss coefficient of the main passage and the loss coefficient of the bypass passage.

The main passage and the bypass passage in the air flowmeter each have a shape that is asymmetrical with respect to its axis in the flow direction of intake air. Thus, the loss coefficient in the forward flow state differs from the loss coefficient in the backflow state in each passage. For this reason, if the bypass delay in the backflow state is compensated using the same value as in the forward flow state, this compensation would be unsuitable and lower the measurement accuracy of the intake air amount. In this respect, the processor of the intake air amount measuring device described above is configured to cause the values of the loss coefficient of the main passage and the loss coefficient of the bypass passage, which are used for compensation for the bypass delay, to be different between the forward flow state, in which the intake air flows through the main passage in the forward direction, and the backflow state, in which the intake air flows through the main passage in the reverse direction. This enables accurate compensation for the bypass delay in either of the forward flow state and the backflow state. The intake air amount measuring device thus accurately measures the intake air amount even when backflow of the intake air occurs in the air flowmeter.

The loss coefficient of each of the main passage and the bypass passage varies depending on the flow velocity of the intake air in the passage and the amount of change in the flow velocity. Thus, the value of the loss coefficient of each passage used for the compensation of bypass delay is preferably changed depending on the flow velocity and the amount of change in the flow velocity. The variations in the loss coefficients in the forward flow state and the backflow state are similar for the main passage and the bypass passage. As such, the processor of the intake air amount measuring device is configured to calculate the loss coefficients used to compensate for the bypass delay as follows. The value of the loss coefficient of the main passage used for compensation in the forward flow state is defined as a forward main loss coefficient, and the value of the loss coefficient of the bypass passage used for compensation in the forward flow state is defined as a forward bypass loss coefficient. The processor is configured to calculate the forward main loss coefficient based on at least one of the flow velocity of intake air in the main passage and the amount of change in the flow velocity in the main passage. The processor is also configured to calculate the forward bypass loss coefficient based on at least one of the flow velocity of intake air in the bypass passage and the amount of change in the flow velocity in the bypass passage. The processor is configured to obtain a product by multiplying the forward main loss coefficient by a predetermined backflow correction coefficient and calculate the product as the value of the loss coefficient of the main passage used for compensation of the bypass delay in the backflow state. The processor is also configured to obtain a product by multiplying the forward bypass loss coefficient by the backflow correction coefficient and calculate the product as the value of the loss coefficient of the bypass passage used for compensation of the bypass delay in the backflow state.

In order to meet the objective, the intake air amount measuring method comprises, by using a bypass-type air flowmeter, separating intake air flowing in an intake passage into a main passage and a bypass passage and outputting a measurement result of an intake flow rate in the bypass passage, calculating an intake air amount of an engine based on the measurement result of the air flowmeter, when calculating the intake air amount, performing lag or lead compensation for a response delay of a change in an intake flow rate in the bypass passage in relation to a change in an intake flow rate in the main passage based on a loss coefficient of the main passage and a loss coefficient of the bypass passage, and causing values of the loss coefficients of the main passage and the bypass passage, which are used in the compensation, to be different between a forward flow state, in which the intake air flows through the main passage in a forward direction, and a backflow state, in which the intake air flows through the main passage in a reverse direction.

In the intake air amount measuring method, the value of the loss coefficient of the main passage used for the compensation in the forward flow state is defined as a forward main loss coefficient, the value of the loss coefficient of the bypass passage used for the compensation in the forward flow state is defined as a forward bypass loss coefficient. The method further comprises calculating the forward main loss coefficient based on at least one of a flow velocity of intake air in the main passage and an amount of change in the flow velocity in the main passage, calculating the forward bypass loss coefficient based on at least one of a flow velocity of intake air in the bypass passage and an amount of change in the flow velocity in the bypass passage, obtaining a product by multiplying the forward main loss coefficient by a predetermined backflow correction coefficient and calculating the product as the value of the loss coefficient of the main passage used for the compensation in the backflow state, and obtaining a product by multiplying the forward bypass loss coefficient by the backflow correction coefficient and calculating the product as the value of the loss coefficient of the bypass passage used for the compensation in the backflow state.

Other aspects and advantages of the present disclosure will become apparent from the following description, taken in conjunction with the accompanying drawings, illustrating exemplary embodiments.

BRIEF DESCRIPTION OF DRAWINGS

FIG. 1 A schematic view showing the structure of the intake system of an engine in which an intake air amount measuring device of one embodiment is used.

FIG. 2 A schematic cross-sectional view of an air flowmeter provided in the intake air amount measuring device.

FIG. 3 A block diagram showing the flow of processes for calculation of an intake air amount in the intake air amount measuring device.

FIG. 4 A flowchart showing the sequence of a bypass delay compensation routine executed by the intake air amount measuring device to calculate the intake air amount.

FIG. 5 A graph showing the relationship among the main flow velocity, the amount of change in the main flow velocity, and the forward main loss coefficient Cs0.

FIG. 6 A graph showing the relationship among the bypass flow velocity, the amount of change in the bypass flow velocity, and the forward bypass loss coefficient Cb0.

DESCRIPTION OF EMBODIMENTS

Referring to FIGS. 1 to 6, an embodiment of an intake air amount measuring device and method are now described in detail.

As shown in FIG. 1, the intake air amount measuring device of the present embodiment is used for an engine 10. The upstream end of the intake passage 11 of the engine 10 includes an air cleaner 12, which cleans the intake air in the intake passage 11. An air flowmeter 13 is located downstream of the air cleaner 12 in the intake passage 11. A throttle valve 14 and a throttle opening sensor 15 are located downstream of the air flowmeter 13 in the intake passage 11. The opening degree of the throttle valve 14 (the throttle opening degree TA) is controlled with a driving device, such as a DC motor, and detected with the throttle opening sensor 15.

A surge tank 16 is located downstream of the throttle valve 14 in the intake passage 11. The surge tank 16 includes an intake pressure sensor 17, which detects the pressure of the intake air in the surge tank 16 (the intake pressure PM). The surge tank 16 is connected to the combustion chambers 20 of cylinders through an intake manifold 18 and intake ports 19 of the cylinders. The intake manifold 18 is a branch pipe for distributing intake air to the cylinders. A fuel injection valve 21 is provided at the intake port 19 of each cylinder to inject fuel. An intake valve 22 is provided between the intake port 19 and the combustion chamber 20 of each cylinder to open and close the intake port 19 relative to the combustion chamber 20.

The air flowmeter 13 and the intake pressure sensor 17 output detection signals to an electronic control unit 23 for engine control. The electronic control unit 23 also receives detection signals from an atmospheric pressure sensor 24, a crankshaft angle sensor 25, and an accelerator operation amount sensor 26. The atmospheric pressure sensor 24 detects the atmospheric pressure PA. The crankshaft angle sensor 25 outputs a pulse signal CRNK each time the crankshaft, which is the output shaft of the engine 10, rotates by a predetermined angle. The accelerator operation amount sensor 26 detects the depression amount of the accelerator pedal (the accelerator operation amount ACCP).

The electronic control unit 23 includes a memory 23A, which stores various programs for engine control, and a microcomputer 23B, which reads and executes programs stored in the memory 23A. The microcomputer 23B reads and executes programs in the memory 23A to perform processes described below. As one of the processes of engine control, the electronic control unit 23 calculates the engine speed NE based on the pulse signal CRNK, which is output by the crankshaft angle sensor 25.

Referring to FIG. 2, the air flowmeter 13 is structured as follows. The air flowmeter 13 is a bypass-type air flowmeter, which separates the intake air flowing through the intake passage 11 into a main passage 27 and a U-shaped bypass passage 28. A thermal flowmeter 29, which may include a platinum hot wire 30 and a temperature sensor 31, is placed in the bypass passage 28 of the air flowmeter 13.

The air flowmeter 13 includes a current control circuit 32, which controls the supply current IA supplied to the hot wire 30. The current control circuit 32 obtains the temperature of the hot wire 30 based on the relationship between the supply current IA and the voltage applied to the hot wire 30. The current control circuit 32 controls the supply current IA supplied to the hot wire 30 so as to maintain a constant difference between the temperature of the intake air, which is detected by the temperature sensor 31, and the temperature of the hot wire 30.

The amount of heat introduced to the hot wire 30 depends on the supply current IA, whereas the amount of heat dissipated into the intake air from the hot wire 30 depends on the flow rate of the intake air and the difference in temperature between the intake air and the hot wire 30. Accordingly, the supply current IA of the hot wire 30 that maintains the balance between the introduced heat and the dissipated heat and thus a constant difference in temperature between the intake air and the hot wire 30 unambiguously depends on the intake flow rate in the bypass passage 28 (the bypass flow rate). The air flowmeter 13 outputs, as the measurement result, the supply current IA of the hot wire 30 to the electronic control unit 23.

The electronic control unit 23 is configured to calculate the intake air amount Q of the engine 10 based on the supply current IA, which is input from the air flowmeter 13. In the intake air amount measuring device of the present embodiment, the electronic control unit 23 serves as the processor that calculates the intake air amount Q based on the measurement result of the air flowmeter 13.

Calculation of Intake Air Amount

FIG. 3 shows the flow of processes performed by the electronic control unit 23 to calculate the intake air amount Q. Calculation of the intake air amount Q uses physical models including an electronic throttle model M1, a multiple TA model M2, a multiple intake pipe model M3, a multiple intake valve model M4, and an AFM model M5. FIG. 3 shows a plurality of TA models M2, a plurality of intake pipe models M3, and a plurality of intake valve models M4 for illustration purpose. However, the present embodiment includes only one TA model M2, one intake pipe model M3, and one intake valve model M4.

The electronic throttle model M1 calculates and outputs a predicted value of throttle opening degree after predetermined time duration from the present (a future throttle opening degree TA0) based on parameters such as the current throttle opening degree TA and the accelerator operation amount ACCP. The electronic throttle model M1 is implemented as a program for calculating the future throttle opening degree TA0 according to the physical model of the behavior of the throttle valve 14.

The TA model M2 calculates and outputs an estimated value of main flow rate based on parameters such as the throttle opening degree, engine speed, and intake pressure. The TA model M2 is implemented as a program for calculating an estimated value of main flow rate according to the physical model of the behavior of the intake air flowing through the throttle valve 14.

The intake pipe model M3 calculates and outputs, based on the main flow rate, an estimated value of pressure of the intake air (intake pressure) in the section of the intake passage 11 downstream of the throttle valve 14. The intake pipe model M3 is implemented as a program for calculating an estimated value of intake pressure according to the physical model of the behavior of the intake air flowing through the intake passage 11. The estimated value of intake pressure calculated by the intake pipe model M3 reflects the variation in intake pressure caused by the opening and closing of the intake valve 22. This variation is calculated by the intake valve model M4, which is the physical model of the behavior of intake air associated with the opening and closing of the intake valve 22.

The AFM model M5 calculates and outputs a value obtained by performing lag compensation on the input main flow rate corresponding to the response delay of the air flowmeter 13. The AFM model M5 includes two models, a bypass delay model M6 and a heat dissipation delay model M7. The bypass delay model M6 is implemented as a program that outputs a value obtained by performing lag compensation on the input value corresponding to a response delay of a change in the bypass flow rate in relation to a change in the main flow rate and (a bypass delay). The heat dissipation delay model M7 is implemented as a program that outputs a value obtained by performing lag compensation on the input value corresponding to a response delay of a change in the heat dissipation amount of the hot wire 30 in relation to a change in the main flow rate (a heat dissipation delay).

The electronic control unit 23 is configured to repeat a predicted intake pressure calculation process S1, an AFM output intake pressure calculation process S2, a current intake pressure calculation process S3, an AFM synchronization intake pressure calculation process S4, and an intake air amount calculation process S5 for each predetermined calculation cycle to calculate an intake air amount Q for each calculation cycle.

The predicted intake pressure calculation process S1 calculates a future intake pressure P0, which is a predicted value of intake pressure after predetermined time duration from the present. The process S1 first inputs the detected current throttle opening degree TA and the detected accelerator operation amount ACCP to the electronic throttle model M1 to calculate a future throttle opening degree TA0. Then, the calculated future throttle opening degree TA0, the current engine speed NE, and the value of future intake pressure P0 calculated in the previous calculation cycle are input to the TA model M2 to calculate a future main flow rate QA0, which is a predicted value of main flow rate after the predetermined time duration from the present. Further, the calculated future main flow rate QA0 is input to the intake pipe model M3 to calculate a future intake pressure P0, which is fed to the intake air amount calculation process S5.

The AFM output intake pressure calculation process S2 calculates an AFM output intake pressure P1, which is an estimated value of intake pressure obtained based on a measurement result of the air flowmeter 13. The process S2 first calculates a measurement main flow rate QA based on the supply current IA of the hot wire 30, which is output by the air flowmeter 13. The calculation of the measurement main flow rate QA uses a calculation map MP1, which contains the relationship between the main flow rate and the supply current IA in the steady state, which is obtained in advance through experiments. Then, the calculated measurement main flow rate QA is input to the intake pipe model M3 to calculate an AFM output intake pressure P1, which is fed to the intake air amount calculation process S5. The value of AFM output intake pressure P1 thus calculated based on the measurement result of the air flowmeter 13 includes a delay corresponding to the response delay of the air flowmeter 13 relative to the current intake pressure.

The current intake pressure calculation process S3 calculates a current intake pressure P2, which is an estimated value of the current intake pressure. That is, the process S3 first inputs the detected current throttle opening degree TA, the detected engine speed NE, and the value of current intake pressure P2 obtained in the previous calculation cycle to the TA model M2 to calculate a current main flow rate QA1, which is an estimated value of current main flow rate. The calculated current main flow rate QA1 is input to the intake pipe model M3 to calculate a current intake pressure P2. The current main flow rate QA1 calculated in the process S3 is fed to the AFM synchronization intake pressure calculation process S4.

The AFM synchronization intake pressure calculation process S4 calculates an AFM synchronization intake pressure P3, which is a value obtained by performing lag compensation on the current intake pressure P2 corresponding to the response delay of the air flowmeter 13. The process S4 inputs the current main flow rate QA1, which is obtained in the current intake pressure calculation process S3, to the bypass delay model M6 to calculate a bypass delay compensation flow rate QA2, which is a value obtained by performing lag compensation on the current main flow rate QA1 corresponding to the bypass delay. Then, the bypass delay compensation flow rate QA2 is input to the heat dissipation delay model M7 to calculate a heat dissipation delay compensation flow rate QA3, which is a value obtained by performing lag compensation on the bypass delay compensation flow rate QA2 corresponding to the heat dissipation delay. The heat dissipation delay compensation flow rate QA3 thus calculated includes the response delay of the air flowmeter 13, that is, the sum of the bypass delay and the heat dissipation delay, relative to the current main flow rate QA1. Further, the process S4 inputs the calculated heat dissipation delay compensation flow rate QA3 to the intake pipe model M3 to calculate an AFM synchronization intake pressure P3, which is fed to the intake air amount calculation process S5. The value of the AFM synchronization intake pressure P3 thus calculated is equivalent to the AFM output intake pressure P1 in response.

The intake air amount calculation process S5 subtracts the AFM synchronization intake pressure P3 from the AFM output intake pressure P1, and adds the difference obtained from this subtraction to the future intake pressure P0 (P0+P1−P3). A predicted intake pressure P is thus calculated. An intake air amount Q is then calculated from the predicted intake pressure P using a calculation map MP2, which contains the relationship between the intake pressure and the intake air amount in the engine 10, which is obtained in advance through experiments. The intake air amount Q thus calculated is a predicted value of intake air amount after predetermined time duration from the present.

Bypass Delay Model

FIG. 4 shows the procedure of the bypass delay compensation routine executed by the electronic control unit 23 to calculate the bypass delay compensation flow rate QA2 in the bypass delay model M6. The electronic control unit 23 repeats the process of this routine for each calculation cycle described above.

The process of this routine starts at step S100, in which the intake flow velocity in the main passage 27 (the main flow velocity Us[i]) is calculated using Equation (1) below and based on the current main flow rate QA1, the air density ρ, and the passage cross-sectional area S of the section of the intake passage 11, in which the air flowmeter 13 is arranged. The air density ρ is calculated based on the temperature of the intake air detected by the temperature sensor 31 and the atmospheric pressure PA detected by the atmospheric pressure sensor 24.

[Math.1]

$$Us[i] = \frac{QA1}{\rho \cdot S} \quad (1)$$

Then, at step S110, a forward main loss coefficient Cs0 is calculated. The forward main loss coefficient Cs0 is the loss coefficient of the main passage 27 in a forward flow state, in which the intake air flows through the air flowmeter 13 in the forward direction, that is, flows toward the combustion chamber 20. The loss coefficient Cs0 is calculated based on the value of main flow velocity Us that is calculated when this routine is performed in the previous calculation cycle (the previous main flow velocity Us[i−1]) and the amount of change in the main flow velocity Us (the main flow velocity change amount ΔUs). As the main flow velocity change amount ΔUs, the present embodiment uses a difference obtained by subtracting the value of main flow velocity Us calculated in the second last calculation cycle from the previous main flow velocity Us[i−1].

FIG. 5 shows the relationship among the previous main flow velocity Us[i−1], the main flow velocity change amount ΔUs, and the forward main loss coefficient Cs0 in the calculation map used to calculate the forward main loss coefficient Cs0. As shown in FIG. 5, the forward main loss coefficient Cs0 is larger when the previous main flow velocity Us[i−1] is lower and the main flow velocity change amount ΔUs is larger.

At step S120, a forward bypass loss coefficient Cb0 is calculated. The forward bypass loss coefficient Cb0 is the loss coefficient of the bypass passage 28 in the forward flow state. The forward bypass loss coefficient Cb0 is calculated based on the value of the bypass flow velocity Ub calculated when this routine is performed in the previous calculation cycle (the previous bypass flow velocity Ub[i−1]) and the amount of change in the bypass flow velocity Ub (the bypass flow velocity change amount ΔUb). As the bypass flow velocity change amount ΔUb, the present embodiment uses a difference obtained by subtracting the value of bypass flow velocity Ub calculated in the second last calculation cycle from the previous bypass flow velocity Ub[i−1].

FIG. 6 shows the relationship among the previous bypass flow velocity Ub[i−1], the bypass flow velocity change amount ΔUb, and the forward bypass loss coefficient Cb0 in the calculation map used to calculate the forward bypass loss coefficient Cb0. As shown in FIG. 6, the forward bypass loss coefficient Cb0 is larger when the previous bypass flow velocity Ub[i−1] is lower and the bypass flow velocity change amount ΔUb is larger.

Then, at step S130, it is determined whether the current main flow rate QA1 is greater than or equal to 0. The sign (positive or negative) of the value of the current main flow rate QA1 indicates the direction of the intake air flowing through the main passage 27. That is, the current main flow rate QA1 is a positive value in the forward flow state, in which the intake air flows through the main passage 27 in the forward direction. The current main flow rate QA1 is a negative value in the backflow state, in which the intake air flows through the main passage 27 in the reverse direction (the direction toward the air cleaner 12). When the current main flow rate QA1 is 0, the present routine considers that the main passage 27 is in the forward flow state for the sake of convenience.

If the current main flow rate QA1 is greater than or equal to 0 and thus the main passage 27 is in the forward flow state (step S130: YES), the process proceeds to step S140. At step S140, the forward main loss coefficient Cs0 calculated at step S110 is set as the value of the loss coefficient Cs of the main passage 27 that is used to calculate a bypass flow velocity Ub[i] at step S160. In addition, at step S140, the forward bypass loss coefficient Cb0 calculated at step S120 is set as the value of the loss coefficient Cb of the bypass passage 28 that is used to calculate a bypass flow velocity Ub[i].

If the current main flow rate QA1 is a negative value and thus the main passage 27 is in the backflow state (step S130: NO), the process proceeds to step S150. At step S150, a product obtained by multiplying the forward main loss coefficient Cs0 calculated at step S110 by a predetermined backflow correction coefficient Re is set as the value of the loss coefficient Cs of the main passage 27 that is used to calculate a bypass flow velocity Ub[i]. In addition, at step S150, a product obtained by multiplying the forward bypass loss coefficient Cb0 calculated at step S120 by the backflow correction co-efficient Re is set as the value of the loss coefficient Cb of the bypass passage 28 that is used to calculate a bypass flow velocity Ub[i].

The process proceeds to step S160 after values of the loss coefficients Cs and Cb are set at either of step S140 and step S150. At step S160, a bypass flow velocity Ub[i], which is the flow velocity of the intake air flowing through the bypass passage 28, is calculated.

The fluid motion equations of the main passage 27 and the bypass passage 28 are expressed by Equations (2) and (3), respectively. In Equations (2) and (3), ΔP represents the difference between the pressures at the inlet and the outlet of the main passage 27 or the bypass passage 28, Ls represents the length of the main passage 27, and Lb represents the length of the bypass passage 28.

[Math.2]

$$\frac{\Delta P}{\rho} = Ls \cdot \frac{dUs}{dt} + Cs \cdot Us[i]^2 \qquad (2)$$

[Math.3]

$$\frac{\Delta P}{\rho} = Lb \cdot \frac{dUb}{dt} + Cb \cdot Ub[i]^2 \qquad (3)$$

Equation (4) is derived by solving Equations (2) and (3) for bypass flow velocity Ub[i]. At step S160, the value that satisfies Equation (4) is calculated as the bypass flow velocity Ub[i], based on the main flow velocity Us, the loss coefficients Cs and Cb, and the previous main flow velocity Us[i−1] and the previous bypass flow velocity Ub[i−1], which are the values of main flow velocity and bypass flow velocity calculated in the previous calculation cycle.

[Math.4]

$$Ub[i] = \frac{-\frac{Lb}{dt} \pm \sqrt{\left(\frac{Lb}{dt}\right)^2 + 4 \cdot Cb \cdot \left\{\frac{Lb}{dt} \cdot Ub[i-1] + Ls \cdot \frac{Us[i] - Us[i-1]}{dt} + Cs \cdot Us[i]^2\right\}}}{2 \cdot Cb} \qquad (4)$$

Then, at step S170, the value that satisfies Equation (5) is calculated as a bypass delay main flow velocity Usb based on the current main flow velocity Us[i] and the loss coefficients Cs and Cb. The bypass delay main flow velocity Usb is a value obtained by performing lag compensation on the current main flow velocity Us[i] corresponding to the bypass delay. The relationship of Equation (5) is derived by solving Equations (2) and (3) for main flow velocity Us assuming that Equations (2) and (3) hold true in the steady state and by setting the time derivatives to 0.

[Math.5]

$$Usb = Ub \cdot \sqrt{\frac{Cb}{Cs}} \qquad (5)$$

Then, at step S180, the value that satisfies Equation (6) is calculated as a bypass delay compensation flow rate QA2 based on the bypass delay main flow velocity Usb, the air density ρ, and the passage cross-sectional area S. The process of this routine is thus ended.

$$QA2 = Usb \cdot \rho S \qquad (6)$$

Heat Dissipation Delay Model

As described above, the AFM synchronization intake pressure calculation process S4 inputs the bypass delay compensation flow rate QA2 to the heat dissipation delay model M7, so that a value of heat dissipation delay compensation flow rate QA3 is obtained by performing lag compensation on the bypass delay compensation flow rate QA2 corresponding to the heat dissipation delay. The heat dissipation delay model M7 calculates the heat dissipation delay compensation flow rate QA3 as follows.

The heat dissipation delay model M7 first calculates a complete heat dissipation amount W based on the bypass delay compensation flow rate QA2. The complete heat dissipation amount W is the convergence value of the heat dissipation amount of the hot wire 30 when the main flow rate is maintained at the value corresponding to the bypass delay compensation flow rate QA2. The complete heat dissipation amount W is calculated using a calculation map that contains the relationship between the main flow rate and the convergence value of the heat dissipation amount of the hot wire 30, which is obtained in advance through experiments. Then, a response heat dissipation amount w is calculated by performing a first-order delay process on the complete heat dissipation amount W using a time constant τ calculated based on the measurement main flow rate QA. This response heat dissipation amount w is used to calculate a heat dissipation delay compensation flow rate QA3. The calculation of the heat dissipation delay compensation flow rate QA3 uses a calculation map that contains the relationship between the main flow rate and the heat dissipation amount of the hot wire 30 in the steady state, which is obtained in advance through experiments. That is, the value of the main flow rate corresponding to the heat dissipation amount equal to the response heat dissipation amount w in the calculation map is calculated as the heat dissipation delay compensation flow rate QA3.

Operation and Advantage of Present Embodiment

An operation and advantages of the present embodiment will now be described.

The present embodiment obtains the bypass delay compensation flow rate QA2 by performing lag compensation on the current main flow rate QA1, which is obtained using a physical model, corresponding to the bypass delay of the air flowmeter 13. Further, the present embodiment obtains the heat dissipation delay compensation flow rate QA3 by performing lag compensation on the bypass delay compensation flow rate QA2 corresponding to the heat dissipation delay of the air flowmeter 13. The AFM synchronization intake pressure P3 calculated based on the heat dissipation delay compensation flow rate QA3 is equivalent to the AFM output intake pressure P1, which is obtained from the measurement result of the air flowmeter 13, in terms of response. As such, any difference between the AFM output intake pressure P1 and the AFM synchronization intake pressure P3 corresponds to the deviation of the measurement result of the air flowmeter 13 from the prediction result of the physical model.

The present embodiment adds the difference between the AFM output intake pressure P1 and the AFM synchronization intake pressure P3 to the future intake pressure P0, which is a predicted value of intake pressure in the future (after predetermined time duration from the present) obtained using physical models, to obtain the predicted intake pressure P, which is used to calculate the intake air amount Q. Thus, the measurement result of the air flowmeter 13 is factored into the prediction value obtained using physical models, thereby increasing the accuracy of the calculation of the intake air amount Q.

The bypass delay compensation flow rate QA2 is calculated by performing lag compensation on the current main flow rate QA1 using the loss coefficients Cs and Cb of the main passage 27 and the bypass passage 28. Pulsation or other factors of the intake air in the intake passage 11 may cause backflow of the intake air in the air flowmeter 13. The shape of each of the main passage 27 and the bypass passage 28 of the air flowmeter 13 is asymmetrical with respect to its axis in the flow direction of intake air. Consequently, the loss coefficients Cs and Cb of the main passage 27 and the bypass passage 28 in the forward flow state differ from those in the backflow state.

In this embodiment, the values of the loss coefficients Cs and Cb used to perform lag compensation corresponding to the bypass delay (the calculation of the bypass delay compensation flow rate QA2) in the forward flow state differ from the values of the loss coefficients Cs and Cb used in the backflow state. This enables accurate lag compensation for the bypass delay in both of the forward flow state and the backflow state. The intake air amount measuring device of the present embodiment thus accurately measures the intake air amount even when backflow of intake air occurs in the air flowmeter 13.

The difference between the forward flow state and the backflow state in the loss coefficient Cs of the main passage 27 is equivalent to that for the loss coefficient Cb of the bypass passage 28. As such, in the present embodiment, the products obtained by multiplying the values of the loss coefficients Cs and Cb in the forward flow state (the forward main loss coefficient Cs0 and the forward bypass loss coefficient Cb0) by a predetermined backflow correction coefficient Re are set as the values of the loss coefficient Cs and Cb that are used for the bypass delay compensation in the backflow state. This eliminates the need for preparing calculation maps of the loss coefficients Cs and Cb for the backflow state in addition to the calculation maps of the loss coefficients Cs and Cb for the forward flow state, thereby simplifying the construction of the logic of the loss coefficient calculation.

The present embodiment may be modified as follows. The above-described embodiments and the following modifications can be combined as long as the combined modifications remain technically consistent with each other.

The above-described embodiment calculates the loss coefficients of the main passage 27 and the bypass passage 28 based on the flow velocities in the passages 27 and 28 and the amounts of change in the flow velocities. However, the loss coefficient of each of the main passage 27 and the bypass passage 28 may be calculated based on one of the flow velocity and the amount of change in the flow velocity. In addition, when the flow velocities and the amounts of change in the flow velocities have limited effect on the variation in the loss coefficients of the main passage 27 and the bypass passage 28, the forward main loss coefficient Cs0 and the forward bypass loss coefficient Cb0 may be fixed values.

In addition to the calculation maps of the forward main loss coefficient Cs0 and the forward bypass loss coefficient Cb0, calculation maps for the backflow state may be prepared separately so as to be used to obtain values of the loss coefficients Cs and Cb for bypass delay compensation in the backflow state.

When the engine 10 is in a steady operation state, in which the intake air amount does not change significantly, or in a low-load operation state, in which the intake air amount is small, the response delay of the air flowmeter 13 has limited effect on the accuracy of the measurement (calculation) of the intake air amount. When the response delay of the air flowmeter 13 has limited effect, the predicted intake pressure P may be calculated by using the current intake pressure P2 instead of the AFM synchronization intake pressure P3 and without performing the AFM synchronization intake pressure calculation process S4.

The inverse model of the bypass delay model M6 and the inverse model of the heat dissipation delay model M7 may be applied to the measurement main flow rate QA, so that a value is calculated by performing lead compensation on the measurement main flow rate QA, which is the measurement result of the air flowmeter 13, corresponding to the response delay. The value thus calculated does not include the response delay and is equivalent to the current main flow rate QA1 in response. As such, to calculate the predicted intake pressure P, the intake pressure calculated by inputting the value obtained by performing lead compensation on the measurement main flow rate QA to the intake pipe model M3 may be used instead of the AFM output intake pressure P1, and the current intake pressure P2 may be used instead of the AFM synchronization intake pressure P3.

The intake air amount measuring device of the above-described embodiment calculates a predicted value of a future intake air amount based on the measurement result of the air flowmeter 13. That is, the above-described embodiment calculates a predicted value of intake air amount after predetermined time duration from the present. Alternatively, the intake air amount measuring device may be configured to calculate the current intake air amount from the detection result of the air flowmeter, instead of the predicted value of future intake air amount. In this case, the inverse model of the bypass delay model M6 and the inverse model of the heat dissipation delay model M7 are applied to the measurement result of the air flowmeter 13 to calculate a value by performing lead compensation for the response delay of the air flowmeter 13. The calculated value may be used to obtain the current intake air amount. Further, in the backflow state, the values of the loss coefficients Cs and Cb of the main and bypass passages 27 and 28 used in the inverse model of the bypass delay model M6 may be different from those in the forward flow state. This enables accurate measurement of the current intake air amount even when backflow of intake air occurs in the air flowmeter 13.

When the delay of a change in the heat dissipation amount of the hot wire 30 in relation to a change in the intake flow rate is insignificant, the heat dissipation delay model M7 or its inverse model does not have to be used. Lag or lead compensation corresponding to the response delay of the air flowmeter 13 may be performed using only the bypass delay model M6 or its inverse model.

The above-described embodiment uses the air flowmeter 13 that outputs, as the measurement result of the intake flow rate in the bypass passage 28, the supply current IA of the hot wire 30 that is required to maintain a constant difference in temperature between the hot wire 30 in the bypass passage 28 and the intake air. Instead of this air flowmeter 13, an air flowmeter may be used that measures the intake flow rate in the bypass passage in a different manner. For example, an air flowmeter may be used that includes a substrate, such as a silicon chip, in the bypass passage. The substrate includes a heater and temperature sensors located on the upstream and downstream sides of the heater. The difference between the values detected by these two temperature sensors is output as the measurement result of the intake flow rate in the bypass passage. In other words, the air flowmeter 13 of the above-described embodiment may be replaced by any bypass-type air flowmeter that separates the intake air flowing through the intake passage into a main passage and a bypass passage and outputs a measurement result of the intake flow rate in the bypass passage.

In the embodiments, the electronic control unit 23 is not limited to a device that includes a central processing unit and a memory and executes all the above-described processes through software. For example, the electronic control unit 23 may include dedicated hardware (an application specific integrated circuit: ASIC) that executes at least part of the various processes. That is, the electronic control unit 23 may be circuitry including 1) one or more dedicated hardware circuits such as an ASIC, 2) one or more processors (microcomputers) that operate according to a computer program (software), or 3) a combination thereof.

Therefore, the present examples and embodiments are to be considered as illustrative and not restrictive and the disclosure is not to be limited to the examples and embodiments given herein.

The invention claimed is:

1. An intake air amount measuring device comprising:
a bypass-type air flowmeter configured to separate intake air flowing in an intake passage into a main passage and a bypass passage and output a measurement result of an intake flow rate in the bypass passage; and
a processor configured to calculate an intake air amount of an engine based on the measurement result of the air flowmeter, wherein the processor is configured to
when calculating the intake air amount, perform lag or lead compensation for a response delay of a change in an intake flow rate in the bypass passage in relation to a change in an intake flow rate in the main passage based on a loss coefficient of the main passage and a loss coefficient of the bypass passage; and
cause values of the loss coefficients of the main passage and the bypass passage, which are used in the compensation, to be different between a forward flow state, in which the intake air flows through the main passage in a forward direction, and a backflow state, in which the intake air flows through the main passage in a reverse direction.

2. The intake air amount measuring device according to claim 1, wherein the value of the loss coefficient of the main passage used for the compensation in the forward flow state is defined as a forward main loss coefficient,
the value of the loss coefficient of the bypass passage used for the compensation in the forward flow state is defined as a forward bypass loss coefficient, and
the processor is configured to
calculate the forward main loss coefficient based on at least one of a flow velocity of intake air in the main passage and an amount of change in the flow velocity in the main passage,
calculate the forward bypass loss coefficient based on at least one of a flow velocity of intake air in the bypass passage and an amount of change in the flow velocity in the bypass passage,
obtain a product by multiplying the forward main loss coefficient by a predetermined backflow correction coefficient and calculate the product as the value of the loss coefficient of the main passage used for the compensation in the backflow state, and
obtain a product by multiplying the forward bypass loss coefficient by the backflow correction coefficient and calculate the product as the value of the loss coefficient of the bypass passage used for the compensation in the backflow state.

3. An intake air amount measuring method comprising:
by using a bypass-type air flowmeter, separating intake air flowing in an intake passage into a main passage and a bypass passage and outputting a measurement result of an intake flow rate in the bypass passage;
calculating an intake air amount of an engine based on the measurement result of the air flowmeter;
when calculating the intake air amount, performing lag or lead compensation for a response delay of a change in an intake flow rate in the bypass passage in relation to a change in an intake flow rate in the main passage based on a loss coefficient of the main passage and a loss coefficient of the bypass passage; and
causing values of the loss coefficients of the main passage and the bypass passage, which are used in the compensation, to be different between a forward flow state, in which the intake air flows through the main passage in a forward direction, and a backflow state, in which the intake air flows through the main passage in a reverse direction.

4. The intake air amount measuring method according to claim 3, wherein the value of the loss coefficient of the main passage used for the compensation in the forward flow state is defined as a forward main loss coefficient,
the value of the loss coefficient of the bypass passage used for the compensation in the forward flow state is defined as a forward bypass loss coefficient, and
the method further comprises:
calculating the forward main loss coefficient based on at least one of a flow velocity of intake air in the main passage and an amount of change in the flow velocity in the main passage;

calculating the forward bypass loss coefficient based on at least one of a flow velocity of intake air in the bypass passage and an amount of change in the flow velocity in the bypass passage;

obtaining a product by multiplying the forward main loss coefficient by a predetermined backflow correction coefficient and calculating the product as the value of the loss coefficient of the main passage used for the compensation in the backflow state; and obtaining a product by multiplying the forward bypass loss coefficient by the backflow correction coefficient and calculating the product as the value of the loss coefficient of the bypass passage used for the compensation in the backflow state.

* * * * *